UNITED STATES PATENT OFFICE.

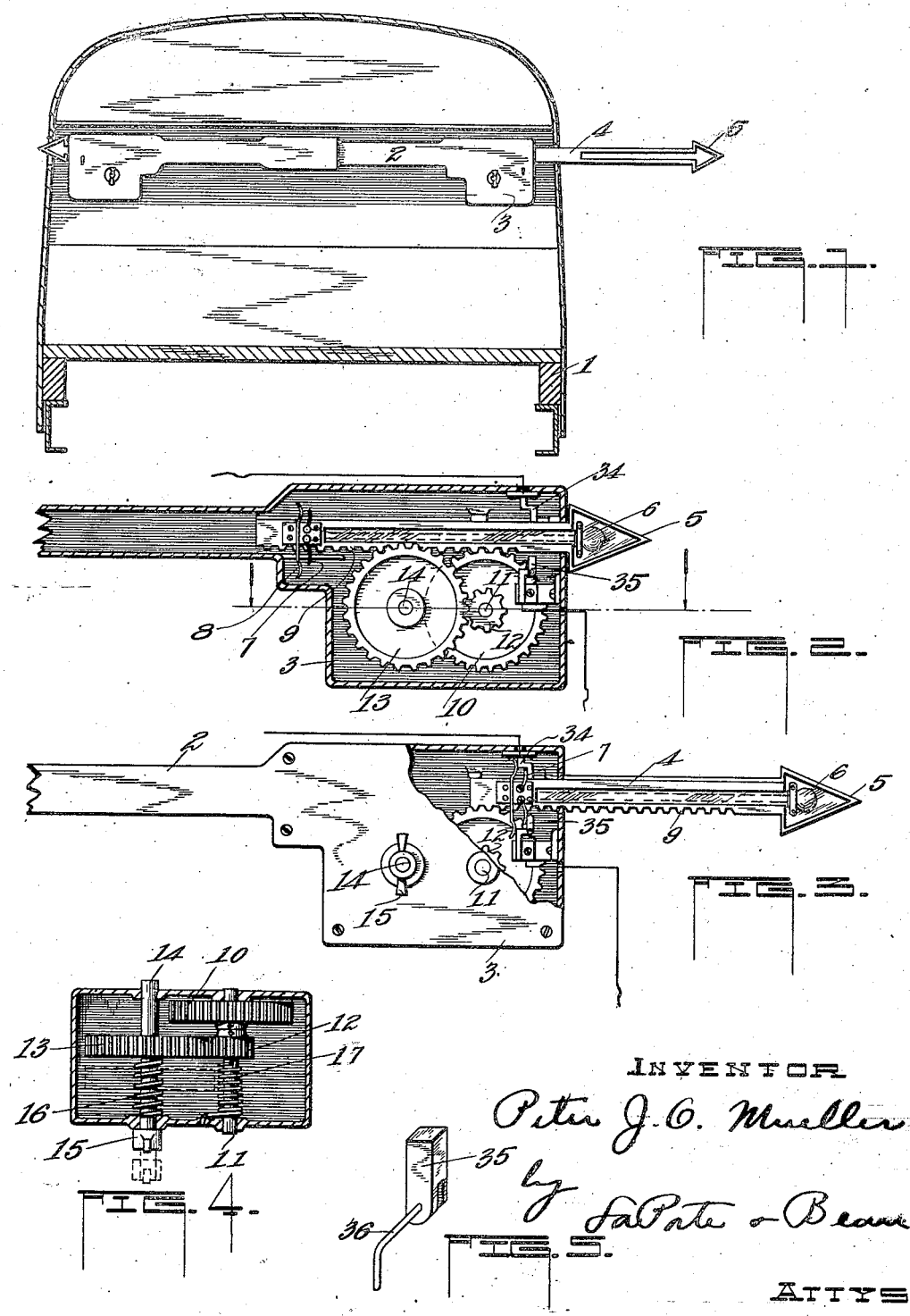

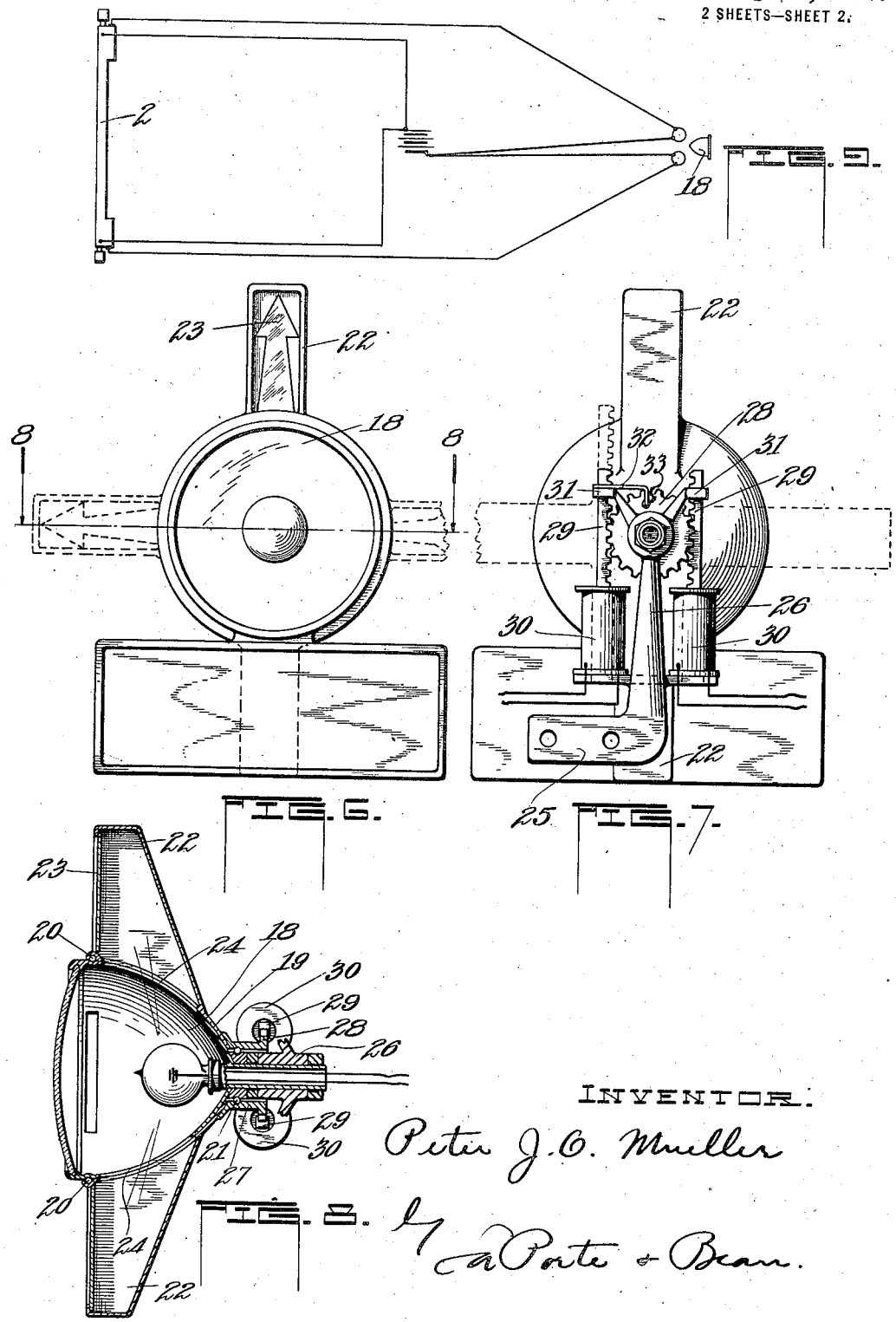

PETER J. O. MUELLER, OF PEORIA, ILLINOIS.

SIGNALING DEVICE FOR VEHICLES.

1,351,532.   Specification of Letters Patent.   Patented Aug. 31, 1920.

Application filed December 31, 1917. Serial No. 209,747.

*To all whom it may concern:*

Be it known that I, PETER J. O. MUELLER, a citizen of the United States, a resident of Peoria, in the county of Peoria and State of Illinois, have invented new and useful Improvements in Signaling Devices for Vehicles, of which the following is a specification.

My invention relates to signaling devices for vehicles, and particularly to direction indicating means for use on automobiles and other motor vehicles.

The principal object of this invention is the provision of means on the forward part of the car to indicate the direction in which the operator intends to turn, and also means on the rear end of the vehicle to make the same indications.

Further objects include improvements in details of construction and arrangement, whereby a simple and effective mechanism of the character described, is provided.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims without digressing from my inventive idea.

In the drawings,

Figure 1 represents an elevational view of the inside of a motor vehicle showing the signaling means for the front portion of the vehicle, the right hand indicator being in an extended position;

Fig. 2 is a vertical cross section through one of the indicating means for the front of the car, disclosing the operating mechanism, and contacts for completing the electric circuits, the indicator being in a retracted or non-extended position;

Fig. 3 is a side elevation of one of the indicating means, the indicator being shown in an extended or indicating position, part of the cover being removed, so as to disclose the operation of the contacts;

Fig. 4 is a horizontal cross section through one of the indicating devices, showing the gearing for operating the indicator;

Fig. 5 is a detail view of a movable contact for permitting the light in the indicator to be illuminated or not, as desired.

Fig. 6 is an elevation of the signal for the rear of the vehicle, the normal position being indicated in full lines and one indicating position being indicated in dotted lines;

Fig. 7 is a rear end member of the same showing the operating mechanism for turning the rear indicator;

Fig. 8 is a horizontal section taken on line 8—8 of Fig. 6, and

Fig. 9 is a wiring diagram of the rear signal control.

Referring to the drawings and particularly to Figs. 1 to 5, inclusive, the numeral 1 designates the body of the car, in the front portion of which is mounted the signaling means for the forward part of the car. Each signaling means comprises the casing 2 mounted in a suitable convenient position, having the enlarged portion 3 shown, for containing the operating means and having an aperture in its end through which the indicator 4 may be extended and retracted. This indicator 4 is in the form of an arm, having the arrow head 5 inclosed with a suitable transparent material, and having the bulb or light 6 mounted therein, the wires from which, extend to the resilient contact 7 on the rear of the arm. Additional resilient contacts 8 are mounted on the rear of the arm for a purpose to be hereinafter described. This arm 4 is provided with the rack 9 which is engaged by the gear wheel 10, mounted on shaft 11 and driven by pinion 12, which meshes with the driving gear wheel 13 on actuating shaft 14, this shaft being rotated by the operator manipulating the button 15. Spring 16 on shaft 14 normally holds the gear 13 in mesh with pinion 12 so that when the button 15 is rotated in the proper direction, the indicating arm 4 will be moved to an extended position. This will cause the tension of spring 17 on shaft 11, to increase so that when the operator desires, he will pull the button 15 outwardly, disengaging the gear 13 from pinion 12 so that gear 10 will be rotated under the influence of the spring 17 to return the arm 4 to its retracted and non-indicating position.

These indicating means are duplicates one of the other, but are arranged so as to project or extend the arms 4 in opposite directions, as shown in Fig. 1. Of course, it is to be understood that the means shown for operating the indicating arm and returning it to its non-indicating position, is but one form of a number which may be utilized to accomplish this operation.

In connection with the indicating means on the forward part of the vehicle, I provide an indicator for the rear of the vehicle, which is operated in co-incidence with that on the forward part of the vehicle.

The rear signal includes the tail light construction 18, about which is rotatably mounted the casing 19, having the anti-friction bearings 20 and 21, shown particularly in Fig. 8. This casing 19 is cup-shaped in form to embrace the tail light and has the two extending portions 22, which are hollow, having the transparent front portions 23, which are marked in the form of the head and tail of an arrow. The side portions of the tail light reflector and casing are cut away as at 24 so as to permit the illumination of the two extending portions 22.

The mechanism is supported on the bracket 25 which has the upstanding arm 26 to support the tail light. The rear extension 27 of the casing 19, is journaled on the anti-friction bearings 21 and is provided with the operating gear or pinion 28, which is in mesh with the racks 29 formed or attached to the armatures of electro-magnets 30. It is therefore seen that when one or the other of the magnets 30 is energized, the gear 28 will be rotated in one direction which will rotate the casing 19, so that the arrow indicating thereon will point in the direction the operator intends to turn. The racks 29 slide in guides 31. The spring member 32 engages in aperture 33 in the gear 28 to normally hold the parts in a neutral position, as indicated in full lines in Figs. 6 and 7.

This rear indicator is operated in coincidence with the front indicators electrically, by means of the rear contact members 8. These contact members 8 engage the terminals 34 mounted in the casing 2 when the arm 4 is in its extended position, and therefore, if the right hand arrow is extended, the arrow in the rear will be turned to the right and vice versa.

As it is not necessary to use any light in the forward indicators during the day time, the contact 35 is movable, being actuated by the arm 36 so that it is readily movable by the operator into and out of engaging position of the contact 7.

It is therefore seen that I have provided a very simple and effective construction for operating indicators on the front of the vehicle and on the rear thereof, to signal to any one in front of the vehicle or in the rear of the vehicle, the direction in which the operator intends to turn.

What I claim is:—

1. In a vehicle signal, a casing, a signal arm movable relative to the casing, rack teeth borne by the arm, a shaft in the casing, a pinion on the shaft, a gear on the shaft in mesh with said rack teeth, a spring coiled on the shaft and connected to the gear and casing so as to be wound upon movement of the gear in one direction, a second shaft slidable in the casing, a gear on the second shaft in mesh with said pinion, means to rotate and slide the second shaft, and a coil spring coiled on the second shaft and abutting the gear thereon and the casing to hold the second gear normally in mesh with said pinion.

2. In a vehicle signal, a casing, a signal arm movable relative to the casing, turnable means to actuate the arm, spring means for tensioning the turnable means whereby upon turning of the latter the spring means will have energy stored therein, and combined slidable and rotatable means for operating the turnable means upon rotation thereof and upon sliding thereof to be disengaged from the turnable means so as to render the latter subject to the influence of the energy stored in said spring means.

3. In a vehicle signal, a casing, a signal arm movable relative to the casing, a rotatable actuating member associated with said arm, a combined slidable and rotatable member for actuating the actuating member upon rotation and disengageable from the actuating member upon sliding thereof, and means for effecting movement of the arm upon sliding of said combined means.

In witness whereof I have hereunto affixed my hand this 22nd day of December, 1917.

PETER J. O. MUELLER.